(12) United States Patent
Nawratil et al.

(10) Patent No.: US 9,605,738 B2
(45) Date of Patent: Mar. 28, 2017

(54) TORQUE CONVERTER

(71) Applicant: ZF Friedrichshafen AG, Friedrichshafen (DE)

(72) Inventors: Odilo Raphael Nawratil, Simpsonville, SC (US); James Frederick Vorberger, II, Simpsonville, SC (US); Won Hyuk Lee, Greenville, SC (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 66 days.

(21) Appl. No.: 14/795,385

(22) Filed: Jul. 9, 2015

(65) Prior Publication Data

US 2017/0009865 A1  Jan. 12, 2017

(51) Int. Cl.
  *F16D 35/00* (2006.01)
  *F16H 45/02* (2006.01)

(52) U.S. Cl.
  CPC ..... *F16H 45/02* (2013.01); *F16H 2045/0226* (2013.01); *F16H 2045/0242* (2013.01); *F16H 2045/0252* (2013.01)

(58) Field of Classification Search
  CPC ............. F16H 45/02; F16H 2045/0252; F16H 2045/0226; F16H 2045/0242
  See application file for complete search history.

(56) References Cited

U.S. PATENT DOCUMENTS

| | | | |
|---|---|---|---|
| 5,277,281 A | 1/1994 | Carlson et al. | |
| 5,823,309 A * | 10/1998 | Gopalswamy | F16D 37/02 192/113.31 |
| 6,006,879 A | 12/1999 | Sudau | |
| 6,279,700 B1 * | 8/2001 | Lisenker | F16F 9/535 188/267.1 |
| 6,336,535 B1 * | 1/2002 | Lisenker | F16F 9/535 188/267 |
| 6,374,698 B1 * | 4/2002 | Carlson | F16F 15/145 192/207 |
| 6,637,556 B1 * | 10/2003 | Lun | F16F 9/537 188/267 |
| 6,860,371 B2 * | 3/2005 | Ananthanarayanan | B23K 11/002 188/267 |
| 8,640,449 B2 | 2/2014 | Huegel et al. | |

* cited by examiner

*Primary Examiner* — David J Hlavka
(74) *Attorney, Agent, or Firm* — Dority & Manning, P.A.

(57) ABSTRACT

A torque converter includes a torsional damper assembly. The torsional damper assembly includes a damper. The damper has an electromagnetic coil and a magnetorheological fluid. The electromagnetic coil is positioned such that a magnetic field from the electromagnetic coil adjusts a viscosity of the magnetorheological fluid when a current flows through the electromagnetic coil.

20 Claims, 4 Drawing Sheets

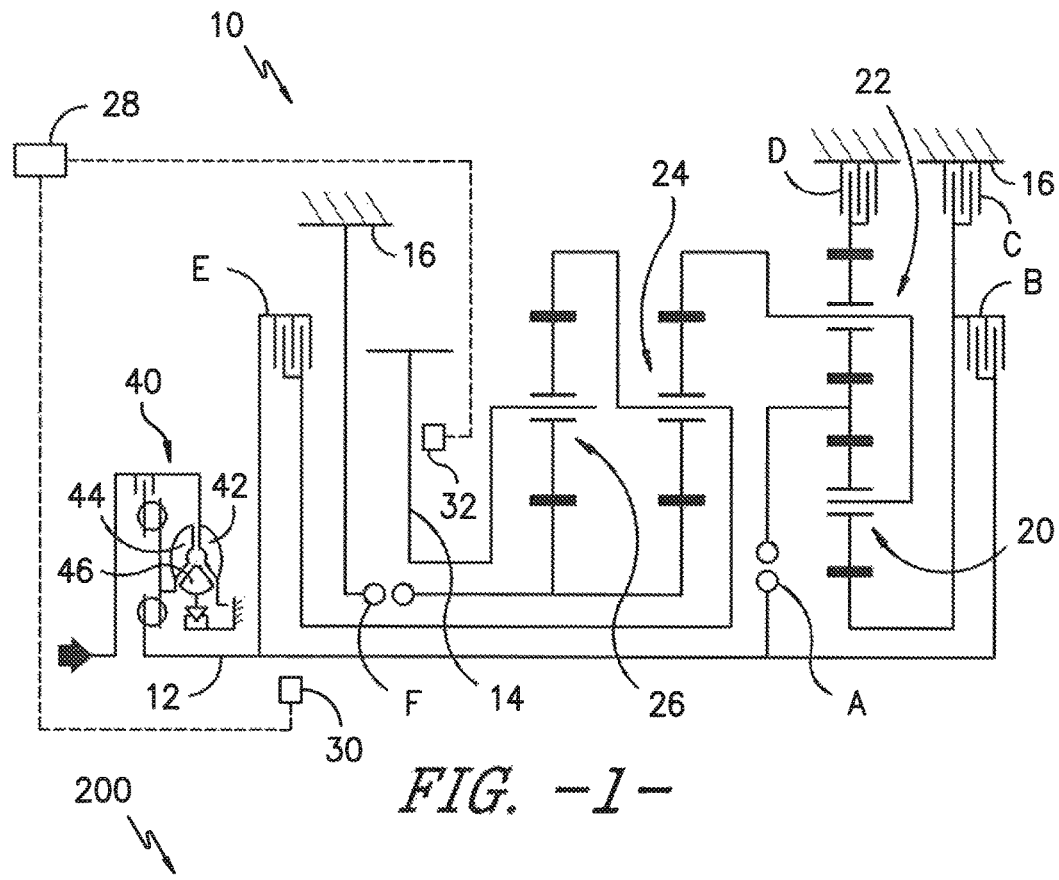
FIG. -1-
|  | A | B | C | D | E | F |
|---|---|---|---|---|---|---|
| "1" | X |  |  | X |  | X |
| "2" | X |  | X |  |  | X |
| "3" | X | X |  |  |  | X |
| "4" | X |  |  |  | X | X |
| "5" | X | X |  |  | X |  |
| "6" | X |  | X |  | X |  |
| "7" | X |  |  | X | X |  |
| "8" |  |  | X | X | X |  |
| "9" |  | X |  | X | X |  |
| "R" |  | X |  | X |  | X |
FIG. -2-

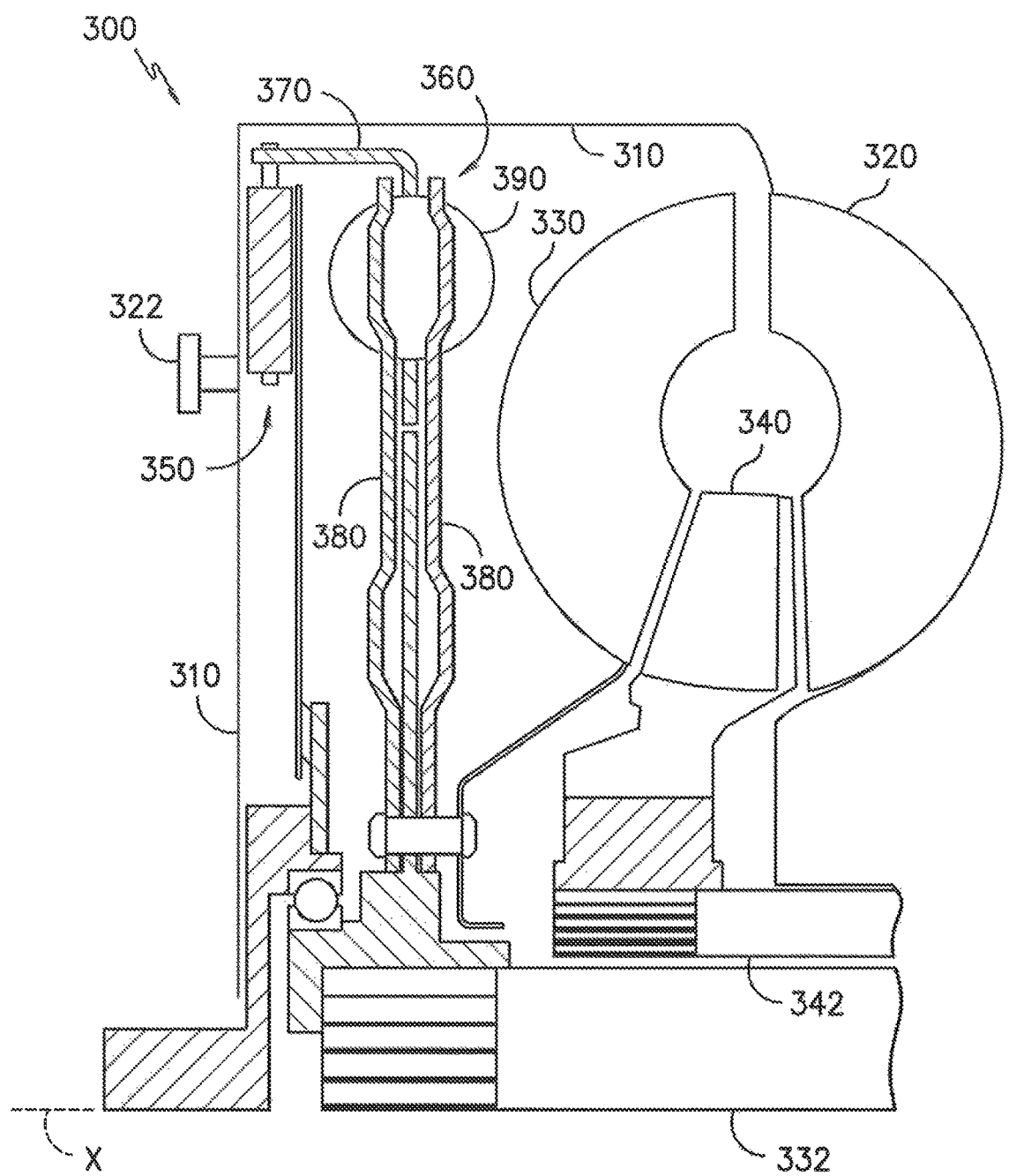
FIG. -3-

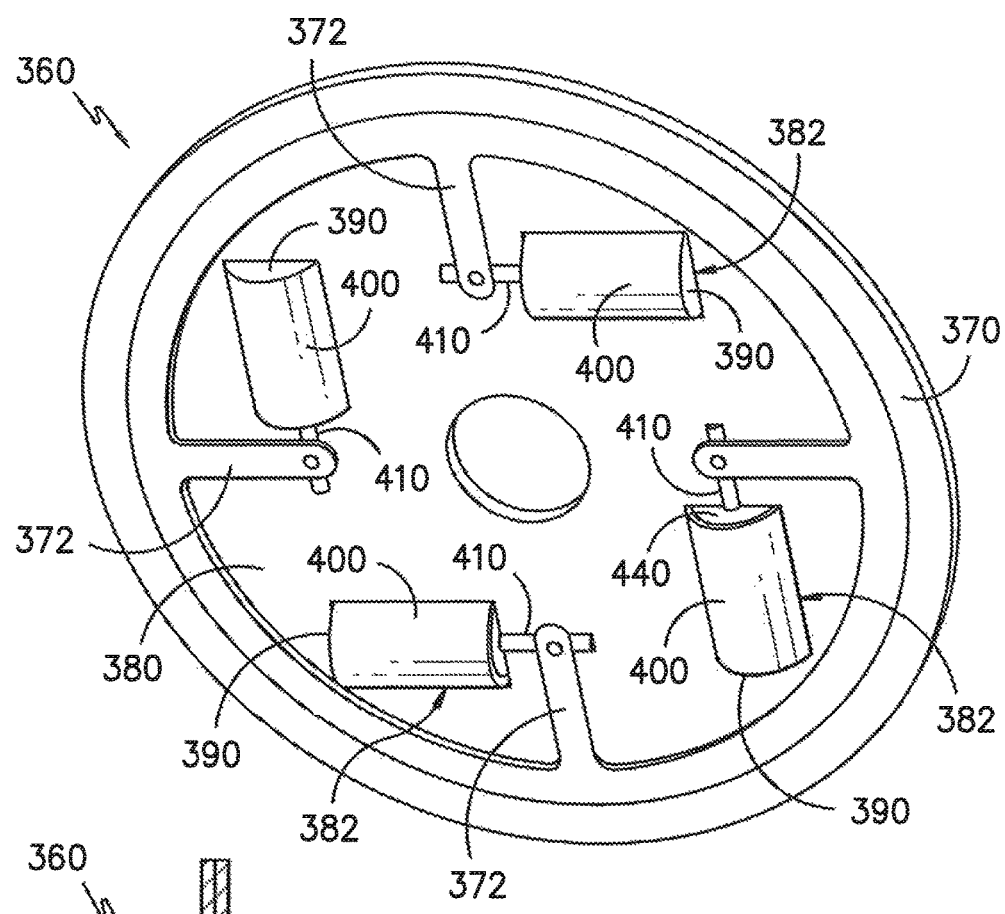
FIG. -4-
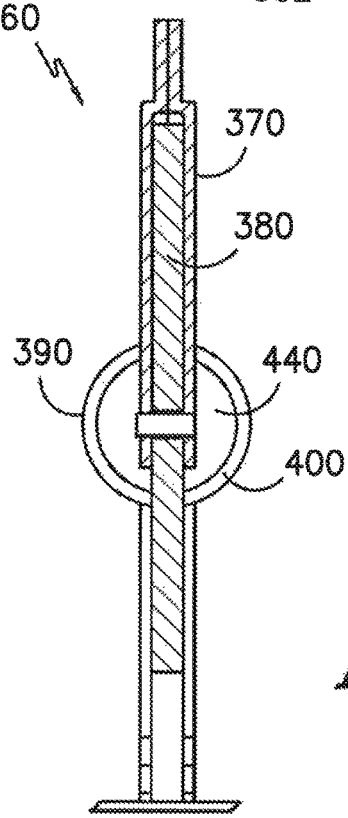
FIG. -5-

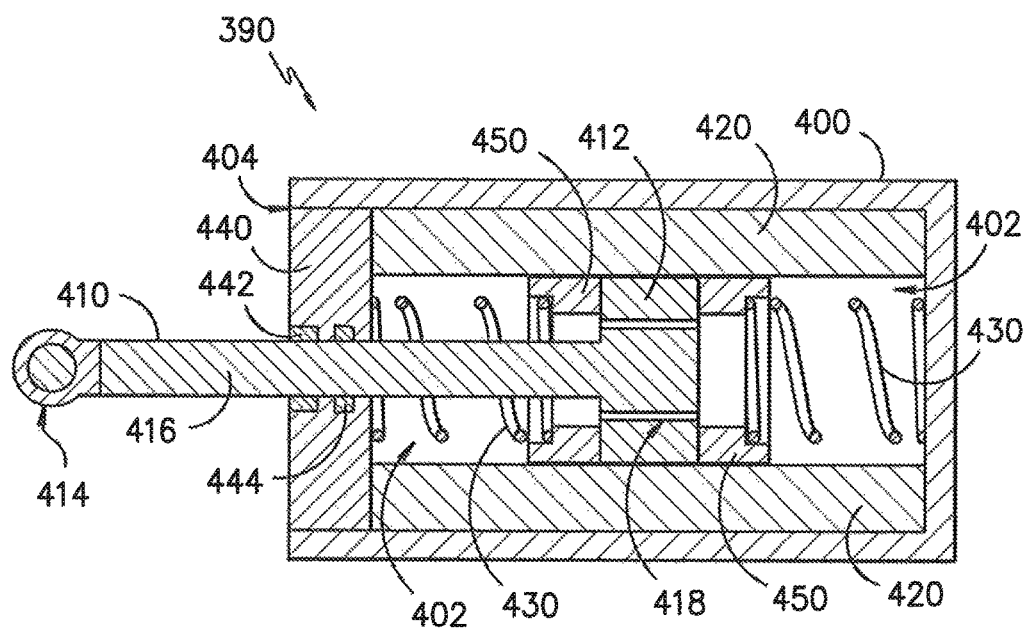
FIG. -6-
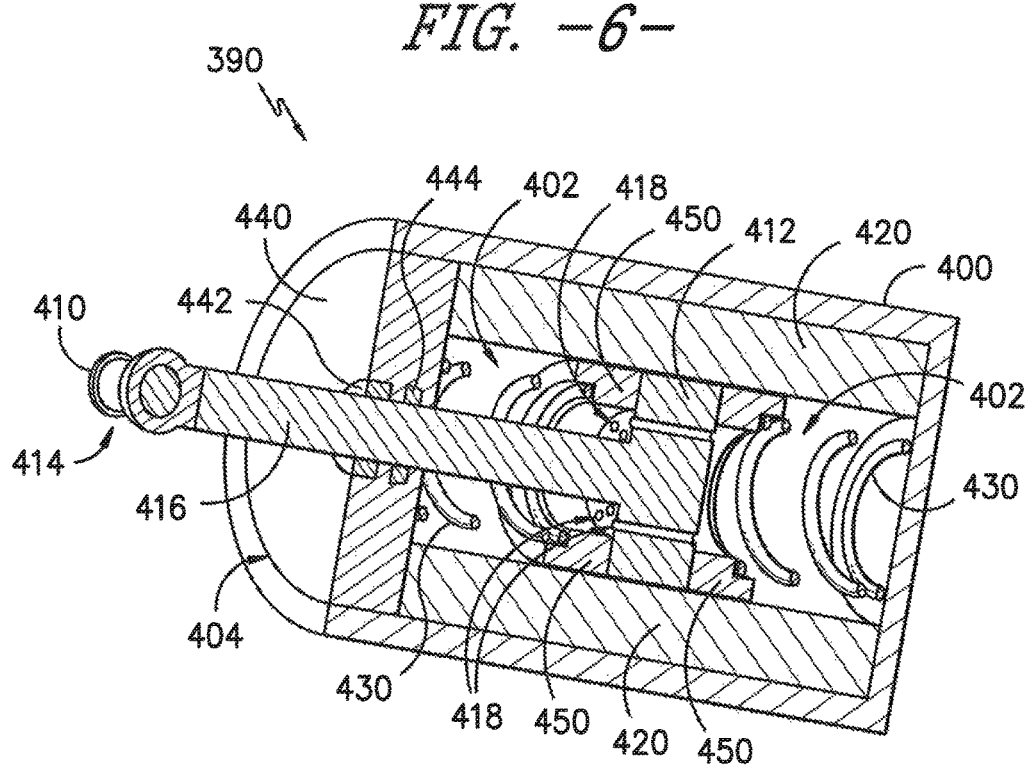
FIG. -7-

TORQUE CONVERTER

FIELD OF THE INVENTION

The present subject matter relates generally to torque converters and torsion dampers for the same.

BACKGROUND OF THE INVENTION

Torque converters are commonly used to couple engines to automatic transmissions. Torque converters generally include a pump that is coupled to the engine and a turbine that is coupled to the automatic transmission. As the engine rotates the pump, fluid from the pump turns the turbine. In turn, the turbine rotates an input shaft of the automatic transmission.

Torque converters can suffer certain drawbacks. For example, as a rotational velocity of the turbine approaches a rotational velocity of the pump, a torque increase provided by the torque converter decreases. The torque increase can approach zero when the rotational velocity of the turbine is about eighty-five percent of the rotational velocity of the pump in certain torque converters. As another example, the fluid coupling between the pump and turbine can limit torque transfer between the engine and automatic transmission. To avoid such torque transfer limits, certain torque converters include a clutch that connects the pump and turbine together. The clutch may be closed when an associated vehicle is traveling at constant velocities.

When the clutch is closed, the engine is directly coupled to the automatic transmission via the clutch. However, torsional vibrations between the engine and automatic transmission can negatively affect performance of an associated vehicle when the clutch is closed. Certain torque converters include coil spring dampers that assist with damping torsional vibrations within the torque converters. However, such coil spring dampers are generally tuned to specific frequencies and offer limited dampening outside of the tuned frequencies.

Accordingly, a torque converter with features for damping torsional vibrations within the torque converter across a wide range of frequencies would be useful. In particular, a torque converter with features for tuning a damping coefficient of the torque converter for a wide range of torsional vibration frequencies within the torque converter would be useful.

BRIEF DESCRIPTION OF THE INVENTION

The present subject matter provides a torque converter with a torsional damper assembly. The torsional damper assembly includes a damper. The damper has an electromagnetic coil and a magnetorheological fluid. The electromagnetic coil is positioned such that a magnetic field from the electromagnetic coil adjusts a viscosity of the magnetorheological fluid when a current flows through the electromagnetic coil. Additional aspects and advantages of the invention will be set forth in part in the following description, or may be apparent from the description, or may be learned through practice of the invention.

In a first exemplary embodiment, a torque converter is provided. The torque converter includes an impeller that is rotatable about an axis. A turbine is positioned proximate the impeller and is rotatable about the axis. A lock-up clutch is configured for selectively adjusting between a closed configuration and an open configuration. A torsional damper assembly includes a damper piston driving plate positioned proximate the lock-up clutch. The damper piston driving plate is coupled to the impeller such that the damper piston driving plate rotates with the impeller when the lock-up clutch is in the closed configuration. A damper housing driving plate is coupled to the turbine such that the damper housing driving plate rotates with the turbine. The torsional damper assembly also includes a plurality of dampers. Each damper of the plurality of dampers includes a housing that is fixed to the damper housing driving plate and a piston that is coupled to the damper piston driving plate. Each housing of the plurality of dampers defines a chamber with a magnetorheological fluid disposed within the chamber of the housing. Each piston of the plurality of dampers is also having a piston head disposed within the chamber of each respective housing of the plurality of dampers. Each damper of the plurality of dampers also having an electromagnetic coil positioned such that a magnetic field from the electromagnetic coil adjusts a viscosity of the magnetorheological fluid within the chamber of the respective housing of the plurality of dampers.

In a second exemplary embodiment, a torque converter is provided. The torque converter includes an impeller that is rotatable about an axis. A turbine is positioned proximate the impeller and is rotatable about the axis. A stator is positioned between the impeller and the turbine. A lock-up clutch is configured for selectively adjusting between a closed configuration and an open configuration. A torsional damper assembly includes a bracket that is positioned adjacent the lock-up clutch. The bracket is coupled to the impeller such that the bracket rotates with the impeller when the lock-up clutch is in the closed configuration. A hub is coupled to the turbine such that the hub rotates with the turbine. A damper is coupled to the bracket and the hub. The damper has an electromagnetic coil and a magnetorheological fluid. The electromagnetic coil is positioned such that a magnetic field from the electromagnetic coil adjusts a viscosity of the magnetorheological fluid when a current flows through the electromagnetic coil.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a schematic view of an automatic transmission according to an exemplary embodiment of the present subject matter.

FIG. 2 illustrates a table of an exemplary shifting scheme as may be used with the exemplary automatic transmission of FIG. 1.

FIG. 3 provides a partial section view of a torque converter according to an exemplary embodiment of the present subject matter.

FIG. 4 provides a perspective view of a torsional damper assembly of the exemplary torque converter of FIG. 3.

FIG. 5 provides a partial section view of the torsional damper assembly of FIG. 4.

FIGS. 6 and 7 provide section views of a damper of the torsional damper assembly of FIG. 4.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a schematic view of an automatic transmission 10 according to an exemplary embodiment of the present subject matter. Automatic transmission 10 may be constructed or arranged in a similar manner to the automatic transmission described in U.S. Pat. No. 8,398,522 to Bauknecht et al., which is hereby incorporated by reference for all purposes. Automatic transmission 10 may be used in any suitable vehicle. For example, automatic transmission 10 may be used in a passenger vehicle, such as a car, truck or sport utility vehicle (SUV). Automatic transmission 10 is configured for selectively adjusting a gear ratio of automatic transmission 10, as will be understood by those skilled in the art, in order to provide a suitable mechanical advantage to propel the associated vehicle.

As may be seen in FIG. 1, automatic transmission 10 includes an input shaft 12 and an output shaft 14. Automatic transmission 10 also includes a torque converter 40 with an impeller 42, a turbine 44 and a stator 46. Torque converter 40 may couple automatic transmission 10 to a motor of an associated vehicle. In particular, input shaft 12 may be coupled to turbine 44 of torque converter 40, and the motor may rotate impeller 42 relative to turbine 44 in order to urge or induce rotation of turbine 44 with oil flow between impeller 42 and turbine 44. In such a manner, torque converter 40 may couple an engine to automatic transmission 10 such that input shaft 12 is rotatable with the motor. Stator 46 may redirect oil flow from turbine 44 towards impeller 42 in order to improve performance of torque converter 40, as will be understood by those skilled in the art. Torque converter 40 may also include a one-way clutch to further improve performance of torque converter 40. Output shaft 14 may be coupled a front axle drive shaft of the associated vehicle. Automatic transmission 10 may change gears in order to adjust the gear ratio between the motor and front axle drive shaft of the associated vehicle, as will be understood by those skilled in the art.

Automatic transmission 10 also includes four planetary gear sets: a first planetary gear set 20; a second planetary gear set 22; a third planetary gear set 24 and a fourth planetary gear set 26. In certain exemplary embodiments, as shown in FIG. 1, third and fourth planetary gear sets 24, 26 may be a Simpson planetary gear set, e.g., such that third and fourth planetary gear sets 24, 26 share a joint sun gear or sun gears of third and fourth planetary gear sets 24, 26 are coupled or fixed together. The sun gear of second planetary gear set 22 may also constitute the ring gear of first planetary gear set 20, and planet gears of first and second planetary gear sets 20, 22 may be mounted to a joint planet carrier that is also coupled or fixedly connected to the ring gear of third planetary gear set 24. The planet carrier of third planetary gear set 24 may also be coupled or fixedly connected to the ring gear of fourth planetary gear set 26.

As may be seen in FIG. 1, automatic transmission 10 further includes a plurality of shifting elements. In particular, automatic transmission 10 includes a plurality of non-positive shift elements and at least one positive shifting element. The non-positive shift elements may be any suitable type of non-positive shift elements. For example, the non-positive shift elements may be multidisc friction shift elements or friction bands. In the exemplary embodiment of FIG. 1, the non-positive shifting elements includes a multidisc clutch B, a multidisc brake C, a multidisc brake D and a multidisc clutch E. The positive shifting elements may also be any suitable type of positive shifting elements, e.g., that provide a form fit or torque proof connection. For example, the positive shifting elements may be dog clutches, dog brakes or claw clutches. In the exemplary embodiment of FIG. 1, the at least one positive shifting element includes a dog clutch A and a dog clutch or brake F. As used herein, the term "clutch" may refer to mechanism for coupling or connecting two rotating components and the term "brake" may refer to a mechanism for coupling or connecting a rotating component to a non-rotating or static component.

The shifting elements of automatic transmission 10 selectively adjust between an open or disengaged configuration and a closed or engaged configuration. In the disengaged configuration, the shifting elements do not engage an associated component of the four planetary gear sets, e.g., and do not or negligibly interfere with rotation of the associated component of the four planetary gear sets relative to the shifting elements. Conversely, in the engaged configuration, the shifting elements engage the associated component of the four planetary gear sets, e.g., and hinder or prevent rotation of the associated component of the four planetary gear sets relative to the shifting elements. As may be seen in FIG. 1, dog clutch A selectively connects or couples input shaft 12 to the sun gear of second planetary gear set 22 and the ring gear of first planetary gear set 20. Multidisc clutch B selectively connects or couples input shaft 12 to the sun gear of first planetary gear set 20. Multidisc brake C selectively connects or couples a transmission housing 16 to the sun gear of first planetary gear set 20. Multidisc brake D selectively connects or couples transmission housing 16 to the ring gear of second planetary gear set 22. Multidisc clutch E selectively connects or couples input shaft 12 to the planet carrier of third planetary gear set 24 and the ring gear of fourth planetary gear set 26. Dog clutch F selectively connects or couples transmission housing 16 to the sun gear of third and fourth planetary gear sets 24, 26.

Automatic transmission 10 also includes an electronic control unit 28, an input speed sensor 30 and an output speed sensor 32. Electronic control unit 28 is in operative communication with various components of automatic transmission 10, including input speed sensor 30 and output speed sensor 32, to regulate operation of automatic transmission 10. Electronic control unit 28 may include a memory and microprocessor, such as a general or special purpose microprocessor operable to execute programming instructions or micro-control code associated with operating of automatic transmission 10. The memory may represent random access memory such as DRAM, or read only memory such as ROM or FLASH. Alternatively, electronic control unit 28 may be constructed without using a microprocessor, e.g., using a combination of discrete analog and/or digital logic circuitry (such as switches, amplifiers, integrators, comparators, flipflops, AND gates, and the like) to perform control functionality instead of relying upon software.

Electronic control unit 28 may be mounted on an exterior of transmission housing 16. Electronic control unit 28 is in operative communication with solenoid valves of the shifting elements of automatic transmission 10. Thus, electronic control unit 28 may selectively adjust the shifting elements between the engaged configuration and the disengaged configuration, e.g., by selectively opening and closing the associated solenoid valves of the shifting elements. In such a manner, electronic control unit 28 may shift automatic transmission 10 between gears during operation of automatic transmission 10, e.g., based at least in part on signals from input speed sensor 30 and output speed sensor 32, as will be understood by those skilled in the art.

Input speed sensor 30 is configured for measuring a speed, e.g., rotations per minute (RPM), of input shaft 12. Input speed sensor 30 may be positioned adjacent input shaft 12 or impeller 44 of torque converter 40. Input speed sensor 30 may be any suitable type of sensor. For example, input speed sensor 30 may be a Hall effect sensor, an optical sensor, etc. Electronic control unit 28 may receive a signal from input speed sensor 30 corresponding to the speed of input shaft 12.

Output speed sensor 32 is configured for measuring a speed, e.g., rotations per minute (RPM), of output shaft 14. Output speed sensor 32 may be positioned adjacent output shaft 14. Output speed sensor 32 may be any suitable type of sensor. For example, output speed sensor 32 may be a Hall effect sensor, an optical sensor, etc. Electronic control unit 28 may receive a signal from output speed sensor 32 corresponding to the speed of output shaft 14.

FIG. 2 illustrates a table 200 of an exemplary shifting scheme as may be used with automatic transmission 10. As may be seen in FIG. 2, automatic transmission 10 includes nine forward gears and one reverse gear. The forwards gears include: first gear "1", second gear "2", third gear "3", fourth gear "4", fifth gear "5", sixth gear "6", seventh gear "7", eighth gear "8", and ninth gear "9". The reverse gear is labeled "R". In table 200, cells filled with "x" indicate the engaged configuration, and blank cells indicate the disengaged configuration. Thus, e.g., dog clutch A, multidisc brake D and dog clutch F are in the engaged configuration in first gear, and multidisc clutch B, multidisc brake C and multidisc clutch E are in the disengaged configuration in first gear. As another example, dog clutch A, multidisc brake C and dog clutch F are in the engaged configuration in second gear, and multidisc clutch B, multidisc brake D and multidisc clutch E are in the disengaged configuration in second gear. In the fourth gear, dog clutch A, multidisc clutch E and dog clutch F are in the engaged configuration. It should be understood that in certain exemplary embodiments, dog clutch A need not be in the engaged configuration to operate automatic transmission 10 in fourth gear. Thus, multidisc clutch E and dog clutch F may be the only shifting elements of automatic transmission 10 in the engaged configuration to operate automatic transmission 10 in fourth gear, in certain exemplary embodiments.

As discussed above, automatic transmission 10 includes nine forward gears and one reverse gear. Thus, automatic transmission 10 is generally referred to as a "nine-speed automatic transmission." However, it should be understood that automatic transmission 10 is provided by way of example only and that the present subject matter may be used in or with any suitable automatic transmission. Thus, the present subject matter is not intended to be limited to use with automatic transmission 10. As an example, the present subject matter may be used in automatic transmissions having five forward gears, six forward gears, eight forward gears, etc. In addition, the present subject matter may be used in automatic transmissions with various driveline configurations, such as front-wheel drive, rear-wheel drive, all-wheel drive, etc.

FIG. 3 provides a partial section view of a torque converter 300 according to an exemplary embodiment of the present subject matter. Torque converter 300 may be used with any suitable automatic transmission. For example, torque converter 300 may be used with automatic transmission 10 as torque converter 40. As discussed in greater detail below, torque converter 300 includes features for assisting with damping torsional vibrations.

As may be seen in FIG. 3, torque converter 300 includes a casing 310, an impeller 320, a turbine 330 and a stator 340. Impeller 320, turbine 330 and/or stator 340 are positioned within easing 310. For example, impeller 320 may be mounted to or formed on casing 310. In addition, a suitable fluid, such as an oil, may be sealed within casing 310, e.g., for transferring energy from impeller 320 to turbine 330 during operation of torque converter 300, as discussed in greater detail below.

Impeller 320 is rotatable about an axis X. In particular, impeller 320 may be coupled or connected to an output coupling 322, via casing 310, and output coupling 322 may be mounted or fixedly connected to an output of an associated motor (not shown). Output coupling 322 may include a flex plate to take up motion in torque converter 300 as rotational speeds change. In such a manner, the associated motor may rotate impeller 320 about the axis X during operation of torque converter 300.

Turbine 330 is positioned proximate impeller 320 and is also rotatable about the axis X. In particular, when the associated motor rotates impeller 320, fluid from impeller 320 may urge turbine 330 to rotate about the axis X. Turbine 330 may be coupled or connected to an input shaft 332, such as input shaft 12 of automatic transmission 10, e.g., via splines on input shaft 332 or any other suitable connection. Thus, when fluid from impeller 320 rotates turbine 330, input shaft 132 may also rotate. In such a manner, fluid flow between impeller 320 and turbine 330 may couple the associated engine to an input shaft of an automatic transmission, such that torque converter 300 transfers energy from the associated engine to the automatic transmission via toroidal fluid flow between impeller 320 and turbine 330.

To assist an efficiency of torque converter 300, stator 340 is positioned between turbine 330 and impeller 320. Stator 340 may be coupled or connected to transmission housing 16 via a connection shaft 342. Stator 340 redirects fluid flow between turbine 330 and impeller 320 such that fluid from turbine 330 is directed onto the blades of impeller 320. In such a manner, the load on impeller 320 may be reduced and the efficiency of torque converter 300 improved, as will be understood by those skilled in the art.

Torque converter 300 also includes a lock-up clutch 350. Lock-up clutch 350 is configured for selectively adjusting between a closed configuration and an open configuration. In the open configuration, the fluid coupling between impeller 320 and turbine 330 transfers energy from the associated engine to the automatic transmission via toroidal fluid flow between impeller 320 and turbine 330, as discussed above. Conversely, in the closed configuration, lock-up clutch 350 couples casing 310 and/or impeller 320 to turbine 330, e.g., such that casing 310, impeller 320 and/or turbine 330 rotate at a common angular velocity. In turn, output coupling 322 and input shaft 332 may rotate at a common angular velocity when lock-up clutch 350 is in the closed configuration. Thus, e.g., torque converter 300 may operate with lock-up clutch 350 in the open configuration when accelerating rapidly or beginning to accelerate in order to take advantage of the torque increase provided by torque converter 300. However, e.g., when the torque increase provided by torque converter 300 is reduced or lost, lock-up clutch 350 may shift from the open configuration to the closed configuration in order to limit or prevent the efficiency loss associated with slip related lag with turbine 330, as will be understood by those skilled in the art.

Torque converter 300 also includes a torsional damper assembly 360. Torsional damper assembly 360 dampens torsional vibrations between various components of torque converter 300, e.g., when lock-up clutch 350 is in the closed configuration. Torsional damper assembly 360 and various features of torsional damper assembly 360 are discussed in greater detail below in the context of FIGS. 4-7.

FIG. 4 provides a perspective view of torsional damper assembly 360. FIG. 5 provides a partial section view of torsional damper assembly 360. As may be seen in FIGS. 4 and 5, torsional damper assembly 360 includes a bracket or damper piston driving plate 370, a huh or damper housing driving plate 380 and dampers 390. Damper piston driving plate 370 is positioned adjacent lock-up clutch 350. Damper piston driving plate 370 is coupled or fixed to casing 310 and/or impeller 320, e.g., such that damper piston driving plate 370 rotates with impeller 320, when lock-up clutch 350 is in the closed configuration. Thus, lock-up clutch 350 may selectively couple damper piston driving plate 370 to casing 310 and/or impeller 320. Damper housing driving plate 380 is coupled or fixed to turbine 330, e.g., such that damper housing driving plate 380 rotates with turbine 330.

Dampers 390 are coupled to and/or extend between both damper piston driving plate 370 and damper housing driving plate 380. For example, each damper of dampers 390 includes a housing 400 and a piston 410. Housing 400 of each damper of dampers 390 is fixed to (e.g., welded, adhered, fastened, integrally formed on, etc.) damper housing driving plate 380, and piston 410 of each damper of dampers 390 is coupled (e.g., fastened, pinned, etc.) to damper piston driving plate 370. In particular, each housing 400 of dampers 390 may be disposed within and mounted to damper housing driving plate 380 within a respective one of a plurality of slots 382 defined by damper housing driving plate 380, and each piston 410 of dampers 390 may be mounted to damper piston driving plate 370 at a respective one of a plurality of connection arms 372 of damper piston driving plate 370.

Dampers 390 may connect damper piston driving plate 370 and damper housing driving plate 380 together and/or hinder rotation of damper piston driving plate 370 and damper housing driving plate 380 relative to each other. In particular, dampers 390 are configured for damping torsional vibrations between damper piston driving plate 370 and damper housing driving plate 380, e.g., when lock-up clutch 350 is in the closed configuration. In such a manner, dampers 390 may assist with limiting or reducing torsional vibrations between the associated engine and the automatic transmission via torque converter 300, e.g., when lock-up clutch 350 is in the closed configuration.

Torsional damper assembly 360 may include any suitable number of dampers 390. For example, as shown in FIG. 4, dampers 390 may include four dampers. In alternative exemplary embodiments, dampers 390 may include at least two dampers, at least three dampers, at least four dampers, at least five dampers, etc. Dampers 390 may also be uniformly distributed about the axis X in certain exemplary embodiments, as shown in FIG. 4.

FIGS. 6 and 7 provide section views of one of dampers 390 of torsional damper assembly 360. Each damper of dampers 390 may be constructed in the same or similar manner to damper 390 shown in FIGS. 6 and 7. However, it should be understood that, in certain exemplary embodiments, dampers 390 may include various combinations of damper types. For example, dampers 390 may include traditional coil springs in addition to the damper design shown in FIGS. 6 and 7.

As may be see in FIGS. 6 and 7, housing 400 of damper 390 defines a chamber 402. A magnetorheological fluid is disposed within chamber 402 of housing 400. As discussed in greater detail below, the magnetorheological fluid within chamber 402 of housing 400 assists with adjusting, a damping coefficient of damper 390. The magnetorheological fluid may be any suitable magnetorheological fluid. For example, the magnetorheological said may include magnetically polarizable, e.g., micron sized, particles, such as carbonyl iron powder, suspended in a low volatility carrier fluid, such as a synthetic hydrocarbon.

As may be see in FIGS. 6 and 7, piston 410 of damper 390 includes a piston head 412. Piston head 412 of piston 410 is disposed within chamber 402 of housing 400 and, e.g., extends across chamber 402 of housing 400 in order to divide chamber 402 of housing 400. Piston head 412 of piston 410 may slide in chamber 402 of housing 400 within the magnetorheological fluid, and the magnetorheological fluid may dampen motion of piston 410 relative to housing 400, as discussed in greater detail below. As shown in FIGS. 5 and 6, piston head 412 of piston 410 may define a plurality of, e.g., axial, through-holes 418. Through-holes 418 of piston head 412 may permit limited or restricted flow of the magnetorheological fluid through piston head 412 of piston 410 between opposite sides of chamber 402 of housing 400.

Piston 410 of damper 390 also includes a distal end 414, e.g., positioned opposite piston head 412 of piston 410 on piston 410 and/or outside of chamber 402 of housing 400. Distal end 414 of piston 410 may be coupled or connected to damper piston driving plate 370. For example, distal end 414 of piston 410 may be rotatable or pivotally mounted to a connection arm 372 of damper piston driving plate 370 with a suitable pivot pin.

Damper 390 also includes an electromagnetic coil 420. Electromagnetic coil 420 is configured for generating a magnetic field for engaging the magnetorheological fluid within chamber 402 of housing 400. The magnetic field from electromagnetic coil 420 adjusts a viscosity of the magnetorheological fluid within chamber 402 of housing 400. In particular, electromagnetic coil 420 may be positioned such that the magnetic field from electromagnetic coil 420 adjusts a viscosity of the magnetorheological fluid within chamber 402 of housing 400 when a current is supplied to electromagnetic coil 420. As an example, electromagnetic coil 420 may be positioned or disposed within chamber 402 of housing 400. Any suitable power supply may be coupled to electromagnetic coil 420 in order to supply a current to electromagnetic coil 420. For example, electronic control unit 28 (FIG. 1) may be connected to electromagnetic coil 420 such that electronic control unit 28 selectively supplies a current to electromagnetic coil 420.

By applying the magnetic field from electromagnetic coil 420 to the magnetorheological fluid within chamber 402 of housing 400, a damping coefficient of damper 390 may be adjusted or changed. For example, the viscosity of the magnetorheological fluid within chamber 402 of housing 400 may be greater when a magnetic field is applied to the magnetorheological fluid within chamber 402 of housing 400 or when a magnitude of the magnetic field applied to the magnetorheological fluid within chamber 402 of housing 400 is increased. Conversely, the viscosity of the magnetorheological fluid within chamber 402 of housing 400 may be less when a magnetic field is not applied to the magnetorheological fluid within chamber 402 of housing 400 or when a magnitude of the magnetic field applied to the magnetorheological fluid within chamber 402 of housing 400 is decreased. As the viscosity of the magnetorheological fluid within chamber 402 of housing 400 changes, the damping of piston 410 by the magnetorheological fluid within chamber 402 of housing 400 also changes, in such a manner, the damping coefficient of damper 390 may be adjusted and performance of torque converter 300 may be improved. In particular, the damping of torsional vibrations with torsional damper assembly 360 may be tuned to damp a range of frequencies by selectively activating and/or adjusting the magnetic field applied to the magnetorheological fluid within chamber 402 of housing 400 by electromagnetic coil 420, as will be understood by those skilled in the art.

As an example, a strength or magnitude of a torsional vibration, e.g., at output coupling 322, may be measured by electronic control unit 28 (FIG. 1) with a suitable sensor. In order to reduce the strength or magnitude of the torsional vibration, electronic control unit 28 may increase or decrease the current supplied to electromagnetic coil 420 in order to adjust the damping characteristics of dampers 390 and decrease the amplitudes of such torsional vibration at input shaft 332. In such a manner, electronic control unit 28 may actively reduce or attenuate torsional vibration at or across torque converter 300 with torsional damper assembly 360 during operation of torque converter 300, e.g., when lock-up clutch 350 is in the closed configuration.

As may be see in FIGS. 6 and 7, housing 400 of damper 390 also defines an opening 404 at an end of housing 400. An end cap 440 is mounted or fixed to housing 400 at opening 404 of housing 400, e.g., such that end cap 440 seals chamber 402 of housing 400. An arm 416 of piston 410, e.g., that extends between piston head 412 and distal end 414 of piston 410, may extend through end cap 440. A seal 442, such as an O-ring, and a centering guide 444, such as a square metal washer, may be positioned on and mounted to end cap 440. Seal 442 may assist with containing the magnetorheological fluid within chamber 402 of housing 400, and centering guide 444 may assist with restricting motion of piston 410 along an axial direction.

Damper 390 further includes a pair of, e.g., coil, springs 430. Springs 430 are coupled to piston 410 and are configured for urging piston 410 towards a default position. In alternative exemplary embodiments, damper 390 may include only a single spring. As may be see in FIGS. 6 and 7, springs 430 are disposed within chamber 402 of housing 400. In particular, each spring of springs 430 extends between housing 400 (e.g., and/or end cap 440) and a respective one of a pair of bump stops 450. Bump stops 450 are positioned on and/or mounted to piston head 412 of piston 410. Bumps stops 450 may be positioned opposite each other about piston head 412 of piston 410 within chamber 402 of housing 400. Bump stops 450 may be constructed of or with an elastomer or similar elastic material. Thus, bump stops 450 may cushion impacts between piston head 412 of piston 410 and housing 400 or end cap 440 during motion of piston head 412 of piston 410 within chamber 402 of housing 400 and there prevent or limit driveline shocks, as will be understood by those skilled is the art.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A torque converter, comprising:
an impeller rotatable about an axis;
a turbine positioned proximate the impeller and rotatable about the axis;
a lock-up clutch configured for selectively adjusting between a closed configuration and an open configuration; and
a torsional damper assembly comprising
a damper piston driving plate positioned proximate the lock-up clutch, the damper piston driving plate coupled to the impeller such that the damper piston driving plate rotates with the impeller when the lock-up clutch is in the closed configuration;
a damper housing driving plate coupled to the turbine such that the damper housing driving plate rotates with the turbine;
a plurality of dampers, each damper of the plurality of dampers comprising a housing fixed to the damper housing driving plate and a piston coupled to the damper piston driving plate, each housing of the plurality of dampers defining a chamber with a magnetorheological fluid disposed within the chamber, each piston of the plurality of dampers also having a piston head disposed within the chamber of a respective housing of the plurality of dampers, each damper of the plurality of dampers also having an electromagnetic coil positioned such that a magnetic field from the electromagnetic coil adjusts a viscosity of the magnetorheological fluid within the chamber of the respective housing of the plurality of dampers.

2. The torque converter of claim 1, wherein the piston of each damper of the plurality of dampers has a distal end rotatably coupled to the damper piston driving plate.

3. The torque converter of claim 1, wherein the piston head of each damper of the plurality of dampers defines a plurality of axial through-holes.

4. The torque converter of claim 1, wherein each damper of the plurality of dampers further comprises a spring disposed within the chamber of the respective housing of the plurality of dampers and coupled to a respective piston of the plurality of dampers such that the spring urges the respective piston towards a default position.

5. The torque converter of claim 4, wherein the housing of each damper of the plurality of dampers defines an opening at an end of the housing, each damper of the plurality of dampers further comprising an end cap mounted to the respective housing of the plurality of dampers at the opening of the respective housing, an arm of each piston of the plurality of dampers extending from a respective piston head through a respective end cap to a distal end of the respective piston of the plurality of dampers.

6. The torque converter of claim 5, wherein the spring of each damper of the plurality of dampers is a first spring and extends between the respective end cap towards the respective piston head, each damper of the plurality of dampers further comprising a second spring extending from the respective housing of the plurality of dampers towards the respective piston head, the first and second springs positioned opposite each other about the respective piston head.

7. The torque converter of claim 1, wherein each damper of the plurality of dampers further comprises a pair of bump stops positioned on a respective piston head, the bump stops of the pair of bump stops positioned opposite each other about the respective piston head, the bump stops of the pair of bump stops comprising an elastomer.

8. The torque converter of claim 1, wherein the electromagnetic coil of each damper of the plurality of dampers is disposed within the chamber of the respective housing of the plurality of dampers.

9. The torque converter of claim 1, wherein the plurality of dampers comprises at least four dampers.

10. The torque converter of claim 1, wherein the dampers of the plurality of dampers are uniformly distributed about the axis.

11. A torque converter, comprising:
an impeller rotatable about an axis;
a turbine positioned proximate the impeller and rotatable about the axis;
a stator positioned between the impeller and the turbine;
a lock-up clutch configured for selectively adjusting between a closed configuration and an open configuration; and
a torsional damper assembly comprising
a bracket positioned adjacent the lock-up clutch, the bracket coupled to the impeller such that the bracket rotates with the impeller when the lock-up clutch is in the closed configuration;
a hub coupled to the turbine such that the huh rotates with the turbine;
a damper coupled to the bracket and the hub, the damper having an electromagnetic coil and a magnetorheological fluid, the electromagnetic coil positioned such that a magnetic field from the electromagnetic coil adjusts a viscosity of the magnetorheological fluid when a current flows through the electromagnetic coil.

12. The torque converter of claim 11, wherein the damper comprises a housing and a piston, the housing fixed to one of the huh or the bracket, the housing defining a chamber, the piston having a piston head disposed within the chamber of the housing and a distal end coupled to one of the hub and the bracket, the magnetorheological fluid disposed within the chamber of the housing.

13. The torque converter of claim 12, wherein the piston head defines a plurality of axial through-holes.

14. The torque converter of claim 12, wherein the damper further comprises a spring disposed within the chamber of the housing and coupled to the piston such that the spring urges the piston towards a default position.

15. The torque converter of claim 14, wherein the housing defines an opening at an end of the housing, the damper further comprising an end cap mounted to the housing at the opening of the housing, an arm of the piston extending from the piston head of the piston through the end cap to the distal end of the piston.

16. The torque converter of claim 15, wherein the spring is a first spring and extends between the end cap towards the piston head, the damper further comprising a second spring extending from the housing towards the piston head, the first and second springs positioned opposite each other about the piston head of the piston within the chamber of the housing.

17. The torque converter of claim 12, wherein the damper further comprises a pair of bump stops positioned on the piston head of the piston, the bump stops of the pair of bump stops positioned opposite each other about the piston head of the piston within the chamber of the housing, the bump stops of the pair of bump stops comprising an elastomer.

18. The torque converter of claim 12, wherein the electromagnetic coil is disposed within the chamber of the housing.

19. The torque converter of claim 12, wherein the distal end of the piston is rotatably mounted to the bracket or the hub.

20. The torque converter of claim 11, wherein the damper is a first damper and the torsional damper assembly comprises at least one additional damper, the first damper and each additional damper of the at least one additional damper uniformly distributed about the axis.

* * * * *